(12) United States Patent
Jankowski et al.

(10) Patent No.: US 6,379,030 B1
(45) Date of Patent: Apr. 30, 2002

(54) HEADLAMP ASSEMBLY

(75) Inventors: James Joseph Jankowski, Harrison Township; Donald Kevin Porter, Olivet, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/709,599

(22) Filed: Nov. 13, 2000

(51) Int. Cl.$^7$ ................................................ F21V 7/04
(52) U.S. Cl. ...................... 362/549; 362/546; 362/507; 362/267
(58) Field of Search .................. 362/546, 549, 362/507, 267

(56) References Cited

FOREIGN PATENT DOCUMENTS

JP          2000-233680    *    8/2000

* cited by examiner

Primary Examiner—Stephen Husar
Assistant Examiner—Guiyoung Lee
(74) Attorney, Agent, or Firm—Laura C. Hargitt

(57) ABSTRACT

An external aiming headlamp assembly including a plastic housing supported on a vehicle body in a headlamp port for universal articulation to aim the headlamp assembly and an adjustable flexible seal on the plastic housing. The flexible seal includes an outer lip bearing against the headlamp port, an inner lip flush against an outside surface of the plastic housing, and a convex web exposed in a clearance gap between headlamp port and the plastic housing. Posts on the plastic housing protrude through slots in the inner lip and include barbs which prevent dislodgment of the inner lip. The slots in an adjustable fraction of the inner lip are elongated and cooperate with the corresponding posts in guiding the adjustable fraction of the inner lip for translation through a range of positions to vary the exposure of the convex web. The edges of the elongated slots are interrupted by notches separated by flexible gates. The notches maintain the adjustable fraction of the inner lip in a position corresponding to maximum exposure of the convex web during aiming of the headlamp assembly. After aiming, the seal is adjusted by manually thrusting the adjustable fraction of the inner lip into the headlamp port until uniform exposure of the convex web is attained.

8 Claims, 3 Drawing Sheets

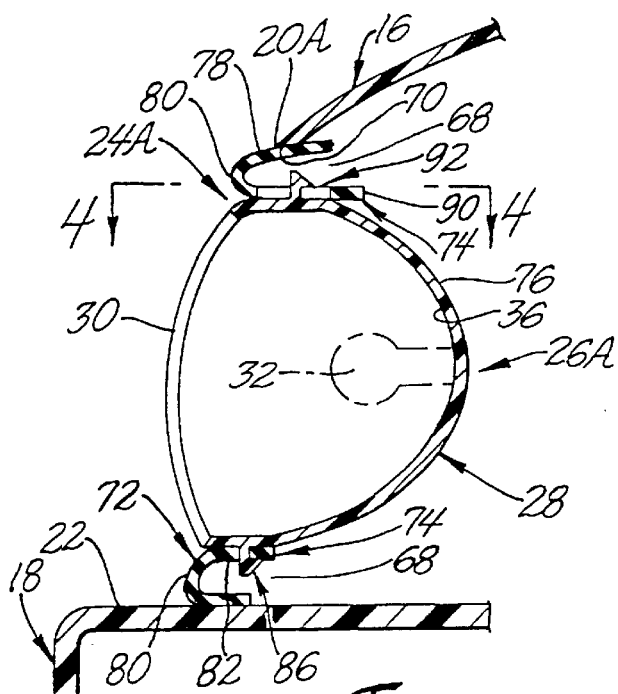
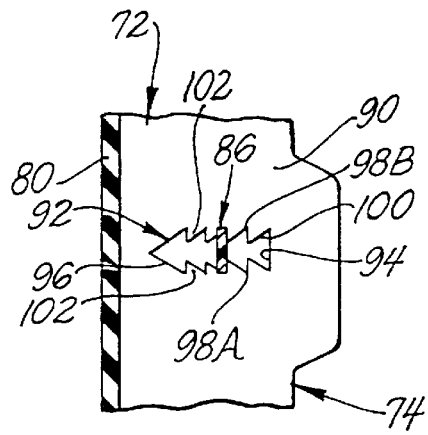
Fig. 3
Fig. 4
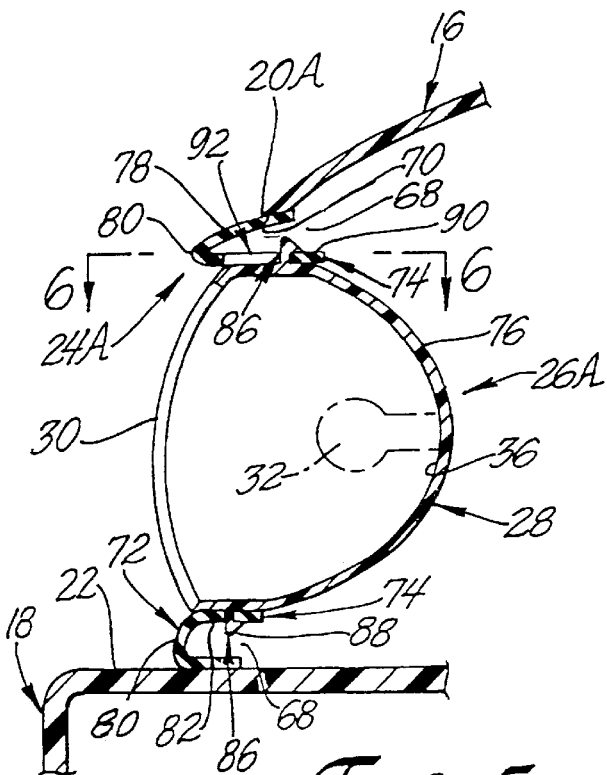
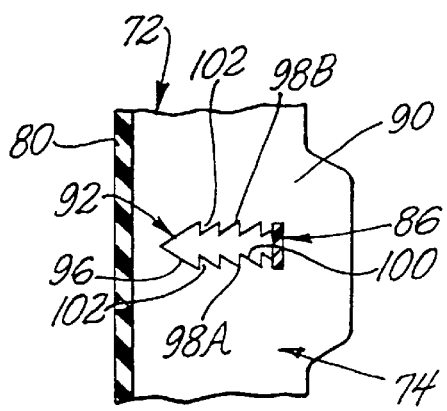
Fig. 5
Fig. 6

HEADLAMP ASSEMBLY

TECHNICAL FIELD

This invention relates to a motor vehicle headlamp assembly.

BACKGROUND OF THE INVENTION

A motor vehicle typically includes a pair of headlamp assemblies supported on a body of the vehicle in respective ones of a pair of laterally separated headlamp openings or ports in the body. Each headlamp assembly includes a plastic housing, a lamp bulb on the housing, and a reflector on the housing which focuses into a concentrated beam the light emitted by the lamp bulb. In a headlamp assembly commonly identified as "external aiming", the reflector is supported on the plastic housing without adjustment and the concentrated light beam is aimed by adjusting the position of the plastic housing relative to the vehicle body. A clearance gap between the headlamp port and the plastic housing of the external aiming headlamp assembly is closed by a flexible seal including an inner lip secured to the plastic housing flush against an outside surface thereof, an outer lip resiliently bearing against a peripheral edge of the headlamp port, and an externally visible convex web between and integral with the inner and outer lips. The seal is most aesthetically appealing when the exposure of the convex web appears uniform around the headlamp assembly. It is, however, a challenge to consistently attain such uniform exposure because the position of the plastic housing of the headlamp assembly after aiming varies from vehicle body to vehicle body due to manufacturing tolerances which stack up during assembly of the vehicle bodies. Accordingly, manufacturers continue to seek external aiming headlamp assemblies in which uniform exposure of a flexible seal on a plastic housing of the headlamp assembly is easily and consistently attainable.

SUMMARY OF THE INVENTION

This invention is a new and improved external aiming headlamp assembly including a plastic housing having a reflector thereon which focuses into a concentrated beam light emitted by a lamp bulb on the housing. The plastic housing is supported on a vehicle body in a headlamp port thereof for universal articulation to aim the headlamp assembly. A flexible seal of the headlamp assembly includes an outer lip bearing against a peripheral edge of the headlamp port, an inner lip flush against an outside surface of the plastic housing, and an integral convex web exposed between headlamp port and the plastic housing. A plurality of integral posts on the plastic housing protrude through a corresponding plurality of slots in the inner lip and include barbs which prevent dislodgment of the inner lip from the plastic housing. The slots in an adjustable fraction of the inner lip are elongated perpendicular to the headlamp port and cooperate with the corresponding integral posts in guiding the adjustable fraction of the inner lip for translation through a range of positions relative to the plastic housing to vary the exposure of the convex web. The edges of the elongated slots are interrupted by notches which grip the integral posts during aiming of the headlamp assembly to retain the adjustable fraction of the inner lip in a position corresponding to maximum exposure of the convex web. After aiming, the seal is adjusted by manually thrusting the adjustable fraction of the inner lip into the headlamp port until uniform exposure of the convex web is attained. The notches in the edges of the elongated slots ratchet over the integral posts and then, after the seal is adjusted, grip the integral posts to retain the adjustable fraction of the inner lip in its adjusted position.

BRIEF DESCRIPTION OF THE DRAWINGS

FIG. 3 is an enlarged sectional view taken generally along the plane indicated by lines 3—3 in FIG. 1;

FIG. 4 is a sectional view taken generally along the plane indicated by lines 4—4 in FIG. 3;

FIG. 5 is a sectional view similar to FIG. 3 showing a flexible seal of the headlamp assembly according to this invention in a different relative position;

FIG. 6 is a sectional view taken generally along the plane indicated by lines 6—6 in FIG. 5;

DESCRIPTION OF THE PREFERRED EMBODIMENT

Figure 1:
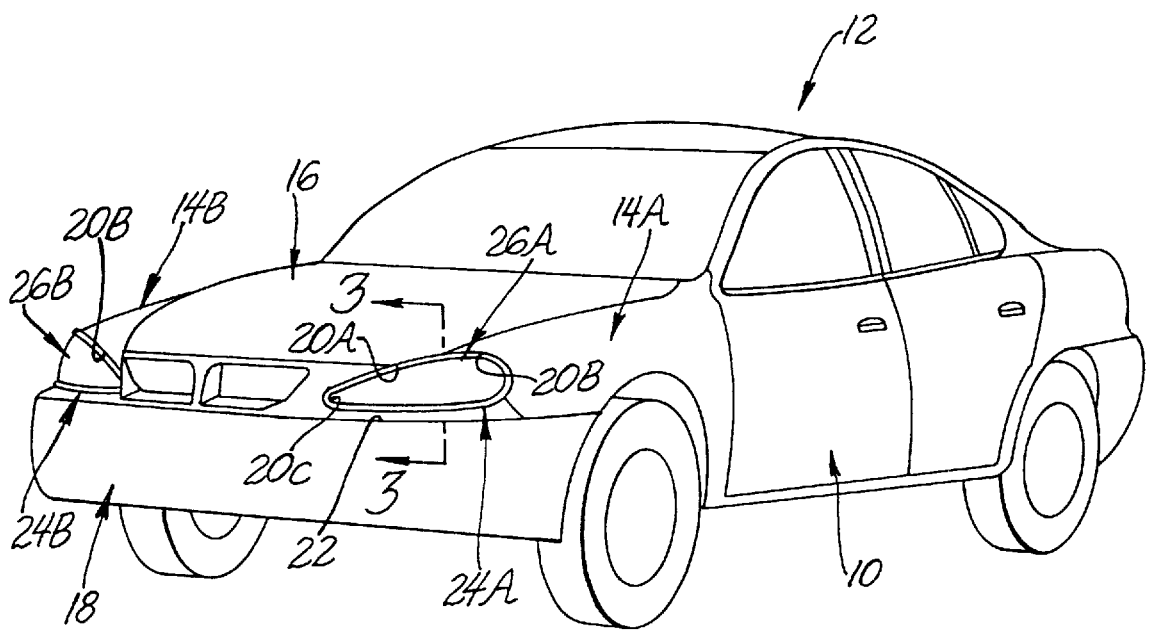
FIG. 1 is a perspective view of a motor vehicle having thereon a headlamp assembly according to this invention.

Referring to FIGS. 1, 3 and 5, a body 10 of a motor vehicle 12 includes a pair of front fenders 14A,14B, a hood 16 between the front fenders, and a facia 18 across the front of the body below the fenders and the hood. Respective ones of a plurality of sculpted edges 20A,20B,20C on the hood, the fenders, and the facia cooperate with a horizontal platform 22 on the facia in defining a pair of mirror-image headlamp openings or ports 24A,24B in the vehicle body. Respective ones of a pair of external aiming headlamp assemblies 26A,26B according to this invention are supported on the vehicle body in the headlamp ports 24A,24B.

Figure 2:
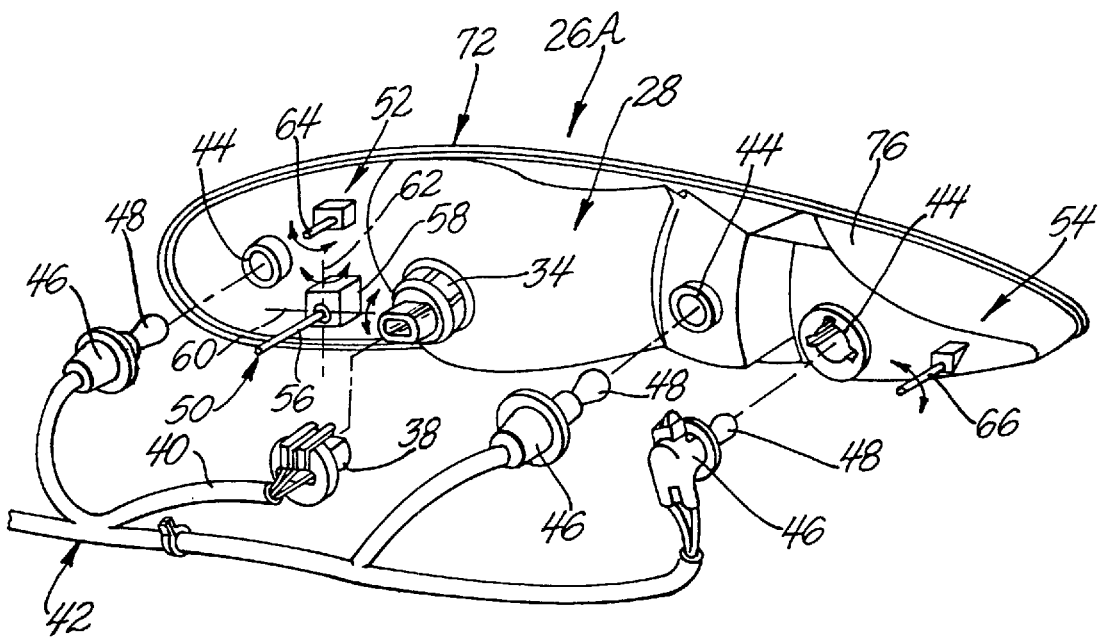
FIG. 2 is a perspective view of the back of a headlamp assembly according to this invention.
Figure 7:
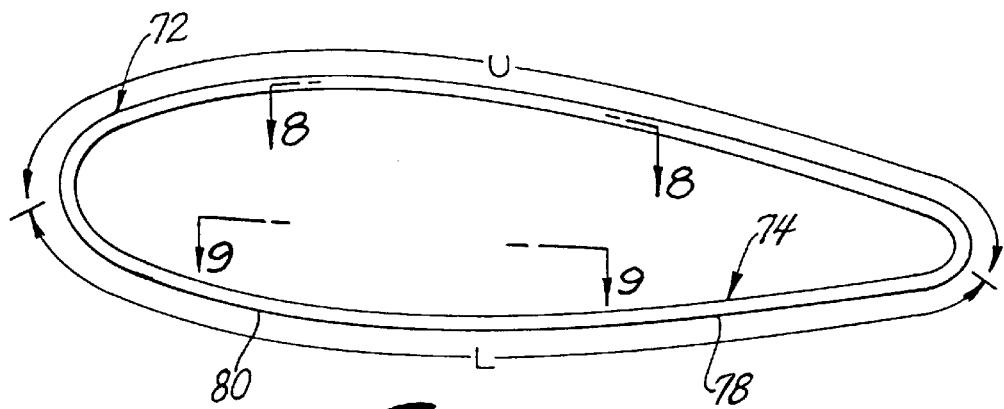
FIG. 7 is an elevational view of the flexible seal of the headlamp assembly according to this invention.
Figure 8:
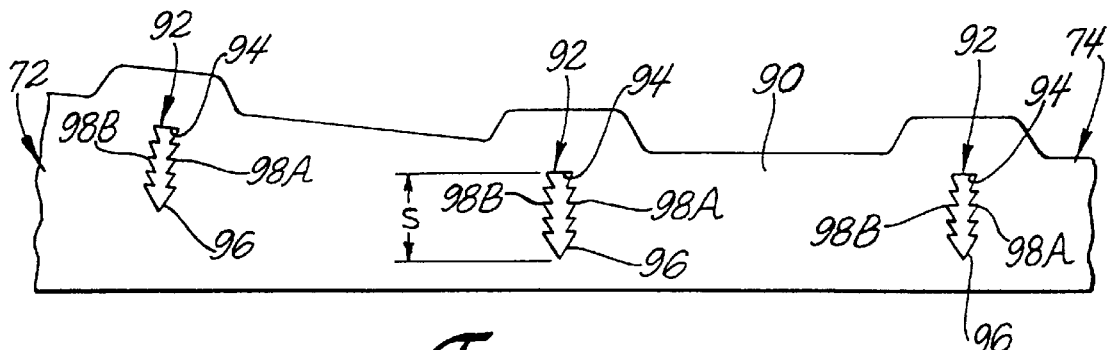
FIG. 8 is a sectional view taken generally along the plane indicated by lines 8—8 in FIG. 7 illustrating an adjustable fraction of an inner lip of the flexible seat of the headlamp assembly according to this invention.
Figure 9:
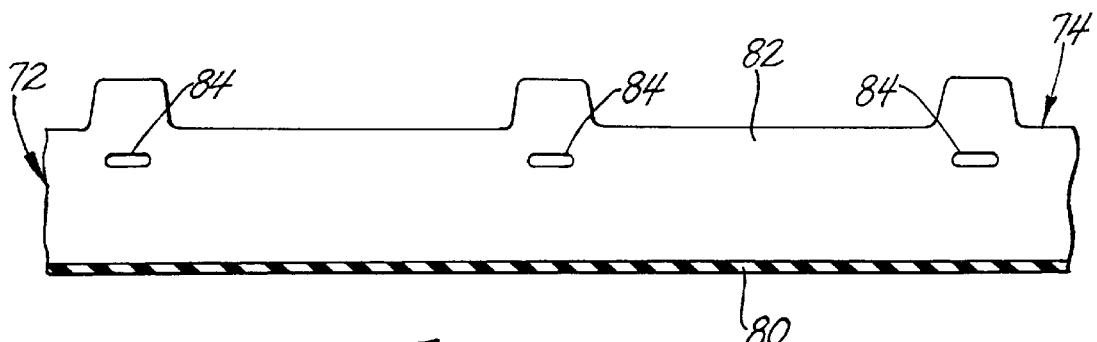
FIG. 9 is a view taken generally along the plane indicated by lines 9—9 in FIG. 7 illustrating a stationary fraction of the inner lip of the flexible seat of the headlamp assembly according to this invention.

Because the headlamp assemblies 26A,26B are mirror images of each other, only the headlamp assembly 26A is now described in detail. The headlamp assembly 26A includes a plastic housing 28 having a clear lens 30 on one side thereof, a lamp bulb 32 in a connector 34, FIG. 2, on the housing 28, and a reflector 36 behind the lamp bulb. The lamp bulb is illuminated by electric current supplied through a plug 38 at the end of a branch 40 of a wiring harness 42 of the motor vehicle. A plurality of apertures 44 in the plastic housing receive respective ones of a corresponding plurality of connectors 46 on additional branches of the wiring harness. The connectors 46 carry respective ones of a plurality of lamp bulbs 48 which are illuminated by electric current supplied through the corresponding branches of the wiring harness.

When the lamp bulbs 32,48 are illuminated, the lens 30 and reflector 36 focus the light emitted by some or all of the lamp bulbs into concentrated beams which are aimed by adjusting the position of the plastic housing relative to the vehicle body. To that end, the plastic housing 28 is supported on the vehicle body 10 through a schematically depicted lower outboard mount 50, a schematically depicted upper outboard mount 52, and a schematically depicted inboard mount 54, FIG. 2. The lower outboard mount 50 includes a ball stud 56 rigidly attached to the vehicle body having a spherical head, not shown, in a socket 58 on the plastic housing. The ball stud and the socket cooperate in supporting the plastic housing on the vehicle body for universal articulation including up and down pivotal movement about a horizontal pivot axis 60 and side to side pivotal movement about a vertical pivot axis 62. The upper outboard mount 52 includes a stud 64 rotatably supported on the vehicle body above the horizontal pivot axis 60 and screwed into a threaded bore in the plastic housing. The inboard mount 54 includes a stud 66 rotatably supported on the vehicle body inboard of the vertical pivot axis 62 and screwed into another threaded bore in the plastic housing. The headlamp assembly is aimed by rotating the studs 64,66 to tip the plastic housing up and down about the horizontal pivot axis and side to side about the vertical pivot axis.

As seen best in FIGS. 3–10, a clearance gap 68 between a peripheral edge 70 of the headlamp port 24A and the plastic housing 28 of the headlamp assembly is closed by a flexible rubber seal 72 shaped to match the plastic housing. The flexible seal includes an inner lip 74 seated flush against an outside surface 76 of the plastic housing, an outer lip 78 bearing against the peripheral edge 70 of the headlamp port, and an integral convex web 80 between the inner and outer lips. The height of the clearance gap 68 is less than the corresponding dimension of the flexible seal 72 so that the inner and outer lips 74,78 are squeezed toward each other and maintained in intimate contact with the outside surface 76 of the plastic housing and the peripheral edge 70 of the headlamp port by corresponding resilient flexure of the convex web 80.

As seen best in FIGS. 4, 6 and 7–9, a lower portion "L" of the flexible seal 72 is disposed generally between the platform 22 of the facia 18 and the headlamp assembly 26A. An upper portion "U" of the flexible seal 72 is disposed generally between the headlamp assembly 26A and the sculpted edges 20A,20B,20C of the hood 16, the fender 14A, and the facia. The segment of the inner lip 74 in the lower portion "L" of the flexible seal constitutes a stationary fraction 82 of the inner lip perforated by a plurality of lateral slots 84 generally parallel to the plane of the headlamp port 24A. The lateral slots 84 are thrust over and stretched around respective ones of a plurality of integral posts 86 on the plastic housing perpendicular to the outside surface thereof. The lateral slots 84 cooperate with the integral posts 86 in preventing relative translation between the stationary fraction of the inner lip and the outside surface of the plastic housing. Each of the integral posts has a barb 88 at an outboard end thereof which constitutes a retaining means preventing dislodgment of the stationary fraction of the inner lip from the plastic housing perpendicular to the outside surface thereof.

The segment of the inner lip 74 in the upper portion "U" of the flexible seal constitutes an adjustable fraction 90 of the inner lip perforated by a plurality of longitudinal slots 92 generally perpendicular to the plane of the headlamp port 24A. Each longitudinal slot 92 has a back end 94, a front end 96 closer to the convex web 80 of the flexible seal, and a pair of side edges 98A,98B. Each of the side edges 98A,98B is interrupted by a plurality of notches 100 in the inner lip separated by a corresponding plurality of flexible gates 102 integral with the inner lip, FIGS. 4 and 6. The longitudinal slots are thrust over and stretched around respective ones of an additional plurality of the integral posts 86 on the plastic housing perpendicular to the outside surface thereof. The barbs 88 at the outboard ends of the additional plurality of integral posts prevent dislodgment of the adjustable fraction 90 of the inner lip from the plastic housing perpendicular to the outside surface thereof.

The notches 100 and the gates 102 in the side edges 98A,98B of the longitudinal slots constitute a latch means which grips the integral posts 86 and prevents relative translation between the adjustable fraction of the inner lip and the outside surface of the plastic housing. Importantly, however, when sufficient thrust is applied to the inner lip parallel to the outside surface of the plastic housing, the flexible gates 102 are forced open to permit translation of the adjustable fraction of the inner lip relative to the outside surface of the plastic housing through a stroke "S", FIGS. 8, corresponding to the lengths of the longitudinal slots between the front and back ends 96,94 thereof. At the same time, the integral posts 86 ratchet between the notches 100. The longitudinal slots thus constitute a guide means which guides the adjustable fraction of the inner lip in translation parallel to the outside surface of the plastic housing 28.

The flexible seal 72 is fitted on the plastic housing 28 before the headlamp assembly 26A is installed on the vehicle body 10 and aimed. Importantly, the flexible seal is initially fitted on the plastic housing with the integral posts 86 at the back ends 94 of the longitudinal slots so that the adjustable fraction of the inner lip is retained during aiming of the headlamp assembly in a position on the plastic housing corresponding to maximum exposure of the convex web 80 in the clearance gap 68, FIGS. 5–6. The position of the adjustable fraction of the inner lip corresponding to maximum exposure of the convex web is predetermined to assure that intimate contact is maintained between the outer lip 78 of the flexible seal and the sculpted edges 20A,20B, 20C of the hood 16, the fender 14A, and the facia 18 throughout the aiming range of the headlamp assembly.

If, after the headlamp assembly 26A is aimed, the exposure of the convex web 80 in the upper portion "U" of the flexible seal 72 appears uneven, the flexible seal is adjusted by manually thrusting the adjustable fraction 90 of the inner lip inward relative to the plane of the headlamp port 24A until the exposure appears uniform. The convex web in the lower portion "L" of the flexible seal does not require corresponding adjustment because the platform 22 on the facia extends far enough beyond the plane of the headlamp port 24A, FIGS. 3 and 5, to visually mask any unevenness in the exposure of the convex web above the platform. In vehicle applications where the lower portion "L" of the flexible seal may require adjustment, the lateral slots 84 may be replaced by additional longitudinal slots 92 for corresponding adjustment of the exposure of the convex web in the lower portion "L".

During manual adjustment of the flexible seal, the gates 102 along the side edges 98A,98B of the longitudinal slots 92 are forced open as the longitudinal slots translate relative to the outside surface of the plastic housing 28. At the same time, the notches 100 ratchet across the integral posts. The position of the adjustable fraction 90 of the inner lip when the convex web is uniformly exposed in the clearance gap 68 constitutes an adjusted position, FIG. 3, of the adjustable fraction of the inner lip in which the latter is retained by the gates 102. The flexible seal 72 is thus easily adjusted on each vehicle body to attain uniform and aesthetically appealing exposure of the convex web thereof.

While only a preferred embodiment of this invention has been described herein, it will be appreciated that other forms could be readily adapted by one skilled in the art. Accordingly, the scope of this invention is to be considered limited only by the following claims.

The embodiments of the invention in which an exclusive property or privilege is claimed are defined as follows:

What is claimed is:

1. A lamp assembly comprising:

a lamp housing supported on a motor vehicle body in a lamp port thereof for universal articulation to aim the lamp assembly, a flexible seal around the lamp housing including an outer lip bearing against a peripheral edge of the lamp port and an inner lip bearing flush against an outside surface of the lamp housing and an integral convex web exposed in a clearance gap between the lamp housing and a peripheral edge of the lamp port resiliently urging relative separation between the inner and the outer lips, a guide means operable to guide an adjustable fraction of the inner lip of the flexible seal in translation parallel to the outside surface of the lamp housing through a range of positions varying the exposure of the convex web of the flexible seal in the clearance gap, a retaining means operable to prevent relative separation between the inner lip of the flexible seal and the lamp housing perpendicular to the outside surface of the lamp housing, and a latch means operable to retain the adjustable fraction of the inner lip of the flexible seal in a position relative to the lamp housing of maximum exposure of the convex web in the clearance gap during aiming of the lamp assembly and in an adjusted position relative to the lamp housing after aiming of the lamp assembly characterized by substantially uniform exposure of the convex web in the clearance gap.

2. The lamp assembly recited in claim 1 wherein the guide means comprises:

a plurality of longitudinal slots in the adjustable fraction of the inner lip of the flexible seal generally perpendicular to the plane of the lamp port and including a pair of parallel side edges, and a plurality of rigid posts on the lamp housing perpendicular outside surface thereof received in respective ones of the plurality of longitudinal slots.

3. The lamp assembly recited in the claim 2 wherein the retaining means comprises:

a barb at an outboard end of each of the plurality of rigid posts.

4. The lamp assembly recited in the claim 3 wherein the latch means comprises:

a plurality of notches in each of the pair of parallel side edges of each of the longitudinal slots resiliently gripping the corresponding one of the plurality of rigid posts therein, and a plurality of integral flexible gates on the inner lip between adjacent pairs of the plurality of notches preventing relative translation between the adjustable fraction of the inner lip and the rigid posts except when forced open by thrust on the inner lip parallel to the outside surface of the lamp housing.

5. A method of sealing a clearance gap between the peripheral edge of a lamp port in a body of a motor vehicle and a lamp housing of a lamp assembly supported on the motor vehicle body in the lamp port for universal articulation to aim the lamp assembly comprising the steps of:

forming a flexible seal matching the shape of the lamp housing including an inner lip and an outer lip and an integral convex web between the inner and the outer lips, mounting the flexible seal on the lamp housing with the inner lip bearing flush against an outside surface of the lamp housing and the convex web exposed in the clearance gap, forming a guide means on the flexible seal and on the lamp housing operable to guide an adjustable fraction of the inner lip of the flexible seal in translation parallel to the outside surface of the lamp housing through a range of positions varying the exposure of the convex web of the flexible seal in the clearance gap, forming a retaining means on the flexible seal and on the lamp housing operable to prevent dislodgment of the inner lip from the lamp housing perpendicular to the outside surface of the lamp housing, forming a latch means on the flexible seal and on the lamp housing operable to retain the adjustable fraction of the inner lip of the flexible seal in any of a plurality of positions relative to the lamp housing within the range of positions varying the exposure of the convex web of the flexible seal in the clearance gap and to release the adjustable fraction of the inner lip in response to thrust thereon parallel to the outside surface of the lamp housing, aiming the lamp assembly with the inner lip of the adjustable fraction of the flexible seal maintained by the latch means in a position corresponding of maximum exposure of the convex web in the clearance gap, and manually thrusting the adjustable fraction of the inner lip of the flexible seal parallel to the outside surface of the lamp housing after aiming the lamp assembly to release the latch means and translate the adjustable fraction of the inner lip into the lamp opening to an adjusted position characterized by relatively uniform exposure of the convex web in clearance gap.

6. The method of sealing a clearance gap recited in claim 5 wherein the step of forming a guide means on the flexible seal and on the lamp housing comprises the steps of:

forming a plurality of longitudinal slots in the adjustable fraction of the inner lip of the flexible seal generally perpendicular to the plane of the lamp port and including a pair of parallel side edges, forming a plurality of rigid posts on the lamp housing perpendicular outside surface thereof, and stretching the plurality of longitudinal slots over respective ones of the rigid posts so that the side edges cooperate with the rigid posts in guiding translation of the adjustable fraction of the inner lip parallel to the outside of the lamp housing.

7. The method of sealing a clearance gap recited in claim 6 wherein the step of forming a retaining means on the seal ring and on the lamp housing comprises the steps of:

forming a barb at an outboard end of each of the plurality of rigid posts.

8. The method of sealing a clearance gap recited in claim 6 wherein the step of forming a latch means on the flexible seal and on the lamp housing comprises the steps of:

forming a plurality of notches in each of the pair of parallel side edges of each of the longitudinal slots resiliently gripping the corresponding one of the plurality of rigid posts therein, and forming a plurality of integral flexible gates on the inner lip between adjacent pairs of the plurality of notches preventing relative translation between the adjustable fraction of the inner lip and the rigid posts except when forced open by thrust on the inner lip parallel to the outside surface of the lamp housing.

* * * * *